(12) United States Patent
Wang et al.

(10) Patent No.: US 11,968,106 B2
(45) Date of Patent: Apr. 23, 2024

(54) METHOD AND APPARATUS FOR MONITORING STATE OF BLOCKCHAIN CONSENSUS NODE

(71) Applicant: HANGZHOU RIVTOWER TECHNOLOGY CO., LTD, Zhejiang (CN)

(72) Inventors: Xiaoliang Wang, Zhejiang (CN); Linyu Chen, Zhejiang (CN)

(73) Assignee: HANGZHOU RIVTOWER TECHNOLOGY CO., LTD, Zhejiang (CN)

(*) Notice: Subject to any disclaimer, the term of this patent is extended or adjusted under 35 U.S.C. 154(b) by 0 days.

(21) Appl. No.: 17/798,089

(22) PCT Filed: Dec. 15, 2020

(86) PCT No.: PCT/CN2020/136597
§ 371 (c)(1),
(2) Date: Aug. 8, 2022

(87) PCT Pub. No.: WO2021/253761
PCT Pub. Date: Dec. 23, 2021

(65) Prior Publication Data
US 2023/0095359 A1    Mar. 30, 2023

(30) Foreign Application Priority Data
Jun. 16, 2020 (CN) .......................... 202010547442.3

(51) Int. Cl.
*G06F 15/173* (2006.01)
*H04L 9/00* (2022.01)
(Continued)

(52) U.S. Cl.
CPC ............ *H04L 43/0823* (2013.01); *H04L 9/50* (2022.05); *H04L 41/0631* (2013.01)

(58) Field of Classification Search
CPC .... H04L 43/0823; H04L 9/50; H04L 41/0631
(Continued)

(56) References Cited

U.S. PATENT DOCUMENTS

2016/0027229 A1* 1/2016 Spanos .................. G07C 13/00
                                                                    705/51
2017/0302663 A1   10/2017 Nainar et al.
(Continued)

FOREIGN PATENT DOCUMENTS

CN         106506203 A      3/2017
CN         107395353 A     11/2017
(Continued)

*Primary Examiner* — Kaylee J Huang
(74) *Attorney, Agent, or Firm* — Samson G. Yu

(57) ABSTRACT

Provided in the embodiment of the present disclosure is a method for monitoring a state of a blockchain consensus node, including that: an address list of all consensus nodes of a blockchain is acquired; the number of produced blocks and the number of times of voting of the consensus nodes in the produced blocks within a preset time period are recorded; a voting monitoring index of each consensus node is calculated, wherein the voting monitoring index includes at least one of a voting rate and a voting proportion; and in response to the voting monitoring index of the consensus node being lower than a preset alarm threshold, an abnormal state alarm in respect of the corresponding consensus node is issued.

13 Claims, 3 Drawing Sheets

(51) Int. Cl.
*H04L 41/0631* (2022.01)
*H04L 43/0823* (2022.01)

(58) Field of Classification Search
USPC .................................. 709/224, 223, 201, 203
See application file for complete search history.

(56) References Cited

U.S. PATENT DOCUMENTS

| | | | |
|---|---|---|---|
| 2019/0213048 A1* | 7/2019 | Mason | .................. H04L 9/0637 |
| 2019/0287199 A1* | 9/2019 | Messerges | .............. G06F 16/27 |
| 2022/0035796 A1* | 2/2022 | Wu | ....................... H04L 9/3247 |

FOREIGN PATENT DOCUMENTS

| | | | | | |
|---|---|---|---|---|---|
| CN | 109714404 | A | | 5/2019 | |
| CN | 110113310 | A | | 8/2019 | |
| CN | 110224854 | A | | 9/2019 | |
| CN | 110677485 | A | | 1/2020 | |
| CN | 109150971 | B | * | 10/2020 | ......... H04L 67/1051 |
| CN | 111786818 | A | | 10/2020 | |
| CN | 109714404 | B | * | 4/2021 | |

* cited by examiner

METHOD AND APPARATUS FOR MONITORING STATE OF BLOCKCHAIN CONSENSUS NODE

TECHNICAL FIELD

The present disclosure relates to the technical field of computer software, and in particular, to a method, apparatus and system for monitoring a state of a blockchain consensus node, and an electronic device.

BACKGROUND

A blockchain belongs to a distributed system. The entire network is constructed by multiple nodes, and it is necessary to install some monitoring software to determine whether each blockchain node service can normally work. An existing solution is to install a detection program at each blockchain node side, and periodically acquires a running condition of each blockchain node, including but not limited to indexes such as Central Processing Unit (CPU) usage rate, memory usage rate, network input/output (IO), disk space, produced block time period, and whether a program process is alive, so as to achieve the purpose of monitoring whether the service of each blockchain node is healthy. The most important index is whether each blockchain node is available, i.e., being able to voting and producing blocks normally, and the availability of each blockchain node influences the availability of the whole blockchain network. Therefore, a solution that a block production condition of each blockchain node in the whole blockchain network can be obtained by means of one of the blockchain nodes, without monitoring each blockchain node, is required to be provided.

SUMMARY

At least some embodiments of the present disclosure provide a method and apparatus for monitoring a state of a blockchain consensus node. To solve the above problem, a consensus node state monitoring component is arranged on any node in a blockchain, and a state anomaly alarm is issued for the corresponding consensus node by calculating a voting monitoring index.

In one embodiment of the present disclosure, a method for monitoring a state of a blockchain consensus node, applied to a consensus node state monitoring component running on any node of a blockchain, is provided, including:
acquiring an address list of all consensus nodes of the blockchain;
recording the number of produced blocks and the number of times of successful voting of the consensus nodes in the produced blocks within a preset time period;
calculating a voting monitoring index of each consensus node, where the voting monitoring index includes at least one of a voting rate and a voting proportion; and
in response to the voting monitoring index of the consensus node being lower than a preset alarm threshold, issuing a state anomaly alarm in respect of the corresponding consensus node.

In one embodiment of the present disclosure, an apparatus for monitoring a state of a blockchain consensus node is provided, including:
an acquisition module, configured to acquire an address list of all consensus nodes of a blockchain;
a recording module, configured to recording the number of produced blocks and the number of times of voting by the consensus nodes in the produced blocks within a preset time period;
a voting monitoring index calculating module, configured to calculate a voting monitoring index of each consensus node, where the voting monitoring index includes at least one of a voting rate and a voting proportion; and
an alarm module, configured to send, in response to the voting monitoring index of the consensus node being lower than a preset alarm threshold, a state anomaly alarm in respect of the corresponding consensus node.

In one embodiment of the present disclosure, a system for monitoring a state of a blockchain consensus node is further provided, including: a consensus node state monitoring component running on any node of a blockchain, where the node state monitoring component is configured to acquire an address list of all consensus nodes of the blockchain, record the number of produced blocks and the number of times of successful voting by the consensus nodes in the produced blocks within a preset time period, calculate a voting monitoring index of each consensus node, and in response to the voting monitoring index of the consensus node being lower than a preset alarm threshold, issue a state anomaly alarm in respect of the corresponding consensus node.

In one embodiment of the present disclosure, an electronic device is further provided, including: a processor; and a memory arranged to store computer executable instructions that, when executed, cause the processor to perform the above-mentioned method.

In an embodiment of the present disclosure, a computer readable storage medium is further provided, including, storing at least one program which, when being executed by an electronic device including multiple application programs, cause the electronic device to execute the above-mentioned method.

At least some embodiments of the present disclosure can achieve at least the following technical effects:

Through simply deploying a piece of monitoring software and simply analyzing the voting result records in the produced blocks, the availability monitoring of consensus nodes in the whole blockchain network is completed, reducing the difficulty and cost of operation and maintenance of the blockchain network.

BRIEF DESCRIPTION OF THE DRAWINGS

To describe the technical solutions in the embodiments of the present disclosure or in the related art more clearly, hereinafter, accompanying drawings requiring to be used in the embodiments or in the related art are introduced briefly. Apparently, the accompanying drawings in the following description show some embodiments described in the present disclosure, and for a person of ordinary skill in the art, other accompanying drawings can also be derived from these accompanying drawings without involving any inventive effort.

DETAILED DESCRIPTION

Figure 1:
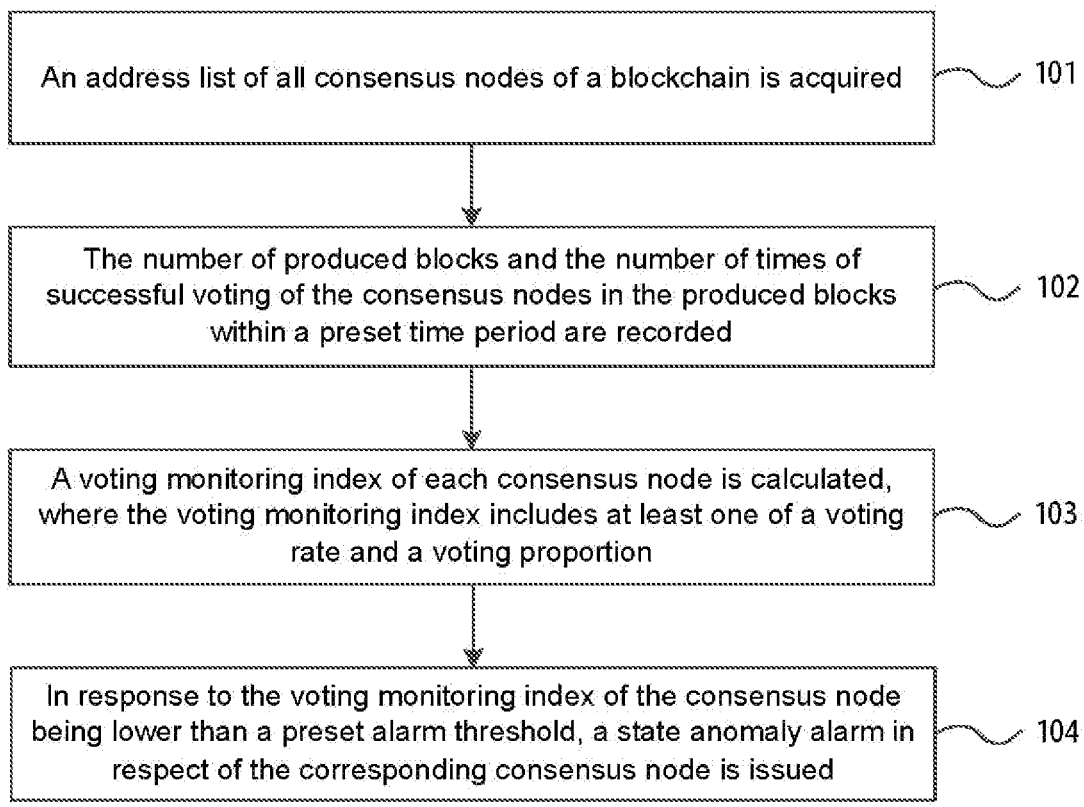
FIG. 1 is a flowchart of a method for monitoring a state of a blockchain consensus node according to one embodiment of the present disclosure.

To make a person skilled in the art better understand the technical solutions of the present disclosure, hereinafter, the technical solutions in the embodiments of the present disclosure will be described clearly and completely with reference to the accompanying drawings of the embodiments of the present disclosure. Obviously, the embodiments as described are some of the embodiments of the present disclosure, and are not all of the embodiments. All other embodiments obtained by a person of ordinary skill in the art on the basis of the embodiments of the present disclosure without any inventive effort shall all fall within the scope of protection of the present disclosure.

Key Terminology

Blockchain technique refers to a brand new distributed infrastructure and computational paradigm that utilizes blockchain data structures to validate and store data, utilizes distributed node consensus algorithms to produce and update data, cryptographically secure data transfer and access, utilizes intelligent contracts made up of automated scripting code to program and manipulate data. Essentially, it is a shared database, and data or information stored therein has the features of being not counterfeit, leaving a track throughout, being traceable, being transparent, being collectively maintained, etc. Based on these features, the blockchain technique defines a firm trust basis, creates a reliable collaboration mechanism, and has a wide application prospect.

Practical Byzantine Fault Tolerance (PBFT) algorithm is one of the classic consensus mechanisms of blockchains, and was proposed by Miguel Castro and Barbara Liskov in 1999, solving the problem of low efficiency of the original Byzantine fault tolerance algorithm. The core theory of this algorithm is n greater than or equal to 3f+1, where n is the total number of nodes in the system, and f is the number of nodes that are allowed to fail. In other words, in response to the system allowing f faults to occur, the system may include n nodes to resolve the faults.

Block production of blockchain involves two factors: node and consensus mechanism. The node determines who is eligible for block production; and the consensus mechanism then determines the node, which can produce blocks eventually, among the nodes having qualify for block production. All nodes have the right for voting, and each time a block needs to be produced, all the nodes participate in voting, and voting is performed according to different consensus mechanisms so as to select a node, and all the nodes achieve consensus by means of the consensus mechanism. In this round of voting, the block produced by the selected node is valid, and blocks produced by other nodes are invalid. For example, in response to the PBFT algorithm being used as the consensus mechanism, the result of this round of voting is valid when n greater than or equal to 3f+1 is satisfied.

The solution of monitoring the state of the blockchain consensus node in the present disclosure will be detailed hereinafter by way of specific examples. It should be noted that, in this embodiment, a blockchain network based on PBFT algorithm is used as a consensus mechanism, the addresses of all the nodes participating in the block production consensus voting is recorded in the block header information of the finally produced block. It should be understood that, any consensus mechanism that supports recording, in the block header information of the produced block, addresses of all nodes participating in consensus voting can implement the above-mentioned solutions in the embodiments of the present disclosure.

Embodiment I

The blockchain network is composed of multiple nodes and is a distributed network structure. Generally, for whether a blockchain node service can work normally, monitoring software needs to be installed in each node to periodically collect running conditions of the node. The collected monitoring indexes include, but are not limited to, CPU usage rate, memory usage rate, network 10, disk space, block production time, whether a program process is alive, etc. The availability of the node affects the availability of the entire blockchain network. In this way, the monitoring cost is relatively high, and the monitoring software needs to cover all nodes in the blockchain. Therefore, in response to the monitoring software being deployed on a certain node of the blockchain, the availability monitoring of the consensus nodes in the entire blockchain network can be completed, achieving the effect of knowing the overall situation from one point, and greatly reducing the difficulty and cost of operation and maintenance of the blockchain network.

As shown in FIG. 1, FIG. 1 is a flowchart of a method for monitoring a state of a blockchain consensus node according to one embodiment of the present disclosure. The premise of the method is that a consensus node state monitoring component is deployed on any node of a blockchain, and the consensus node state monitoring component is configured to execute consensus node monitoring method. The method includes the following steps.

At step 101, an address list of all consensus nodes of a blockchain is acquired.

At step 102, the number of produced blocks and the number of times of successful voting of the consensus nodes in the produced blocks within a preset time period are recorded.

Figure 2:
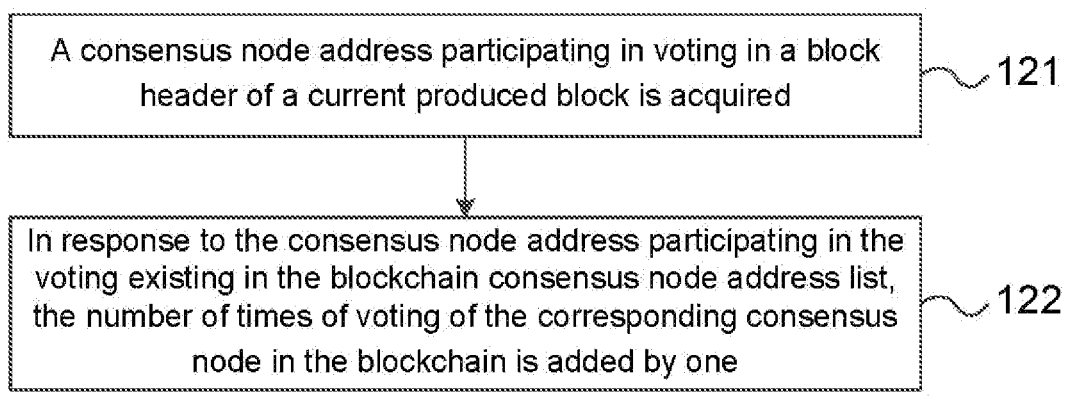
FIG. 2 is a flowchart of another method for monitoring a state of a blockchain consensus node according to one embodiment of the present disclosure.

Optionally, before recording the number of successful votes cast by the consensus node, the number of votes cast by the blockchain consensus node is cleared, as shown in FIG. 2, the method further includes the following steps.

At step 121, a consensus node address participating in voting in a block header of a current produced block is acquired.

At step 122, in response to the consensus node address participating in the voting existing in the blockchain consensus node address list, the number of times of voting of the corresponding consensus node in the blockchain is added by one.

At step 103, a voting monitoring index of each consensus node is calculated, where the voting monitoring index includes at least one of a voting rate and a voting proportion.

Optionally, the voting rate is a ratio of the total number of times that each of the consensus nodes participates in voting to the total number of produced blocks in the blockchain within the time period.

Optionally, a voting proportion is a ratio of the total number of times that each of the consensus nodes participates in voting to the total number of times that all the consensus nodes in the blockchain participate in voting within the time period.

At step 104, in response to the voting monitoring index of the consensus node being lower than a preset alarm threshold, a state anomaly alarm in respect of the corresponding consensus node is issued. Optionally, the manners of issuing a state anomaly alarm include automatically sending at least one of an email, a short message, and a system message. The short message may be a short message in mobile communication. The system message may be an application (APP) message that can be viewed by a mobile terminal or a Personal Computer (PC) end.

Figure 3:
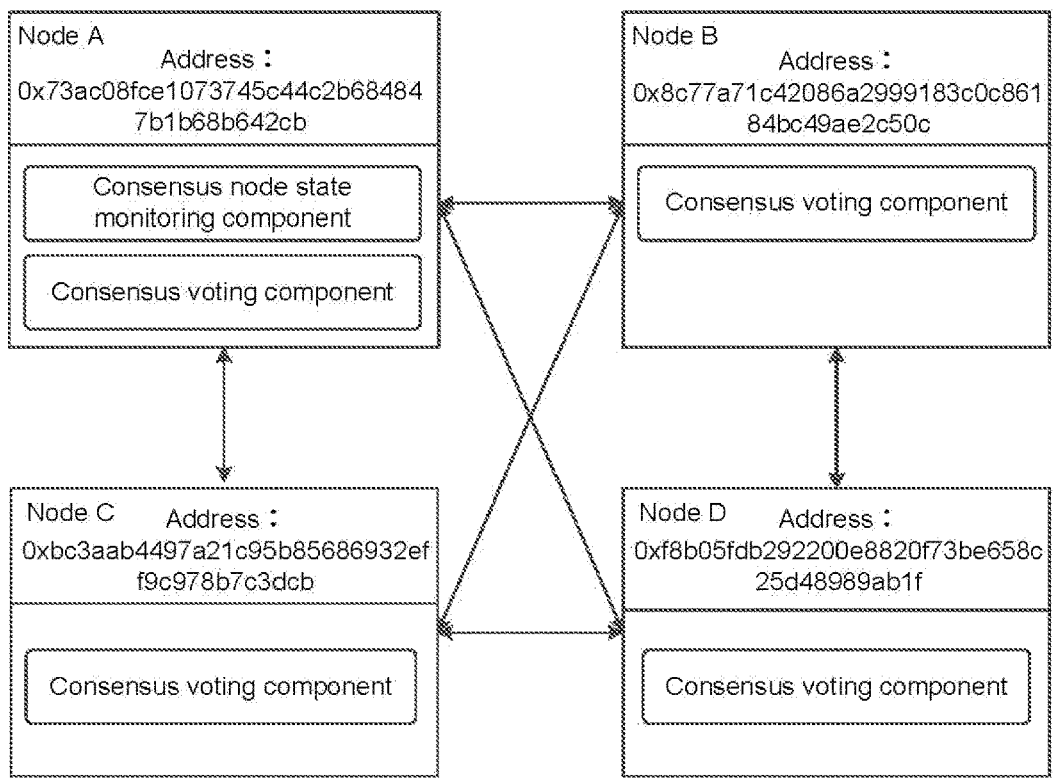
FIG. 3 is a schematic diagram of an operating environment of a method for monitoring a state of a blockchain consensus node according to one embodiment of the present disclosure.

The implementation process of the above-mentioned method is illustrated below with reference to FIG. 3. As shown in FIG. 3, the current blockchain has four nodes A, B, C and D in total. All of the four nodes are conscious nodes that can participate in proposal voting. Each conscious node has a consensus voting component. The conscious node state monitoring component is deployed on the node A. According to the method steps:

first, the address list of all consensus nodes are acquired.

| Node identifier | Node address |
|---|---|
| A | 0x73ac08fcel073745c44c2b684847b1b68b642cb |
| B | 0x8c77a71c42086a2999183c0c86184bc49ae2c50c |
| C | 0xbc3aab4497a21c95b85686932eff9c978b7c3dcb |
| D | 0xf8b05fdb292200e8820f73be658c25d48989ab1f |

Secondly, the number of produced blocks and the number of times of voting by the consensus nodes in the produced blocks within a preset time period are recorded. In this embodiment, 15 minutes are taken as an example, however it should be understood that, when a monitoring and alarming frequency demand and a reasonable block produce speed are satisfied, a preset monitoring time period may be randomly set. Within the last 15 minutes, a total of 10 rounds of consensus voting have occurred with the blockchain network.

With regard to the number of produced blocks, in response to ensuring that block production can be performed successfully in 10 rounds of consensus voting, according to the PBFT algorithm used in this embodiment, in each round of consensus voting, at most one consensus node is allowed to fail and not participate in voting. Assume that block production is performed successfully in 10 rounds of consensus voting, i.e., the number of produced blocks within 15 minutes is 10.

For the number of times of voting of the consensus nodes in the produced blocks, the successful times of voting of the blockchain consensus nodes are cleared first, and then the number of times of voting of each consensus node within time period is calculated. For a produced block, the block header information of this produced block records at least one consensus node address participating in voting. In response to the addresses of nodes A, B, C and D all appearing in the block header information of the produced block, the number of times of voting of nodes A, B, C and D is increased by one. In response to only the addresses of the nodes A, C and D appear in the block header information of the produced block, the number of times of voting of the nodes A, C and D is increased by one respectively, and the number of times of voting of the node B remains unchanged; and so on. All the produced blocks within the 15 minutes are subjected to the above-mentioned operations, and it is assumed that, during this period, the node B successfully participates in the voting of block production of 5 blocks due to faults such as network delay; therefore, the number of times of successful voting of each node in the 15 minutes are as follows.

| Node identifier | Node address | The number of times of voting |
|---|---|---|
| A | 0x73ac08fcel073745c44c2b684847b1b68b642cb | 10 |
| B | 0x8c77a71c42086a2999183c0c86184bc49ae2c50c | 5 |
| C | 0xbc3aab4497a21c95b85686932eff9c978b7c3dcb | 10 |
| D | 0xf8b05fdb292200e8820f73be658c25d48989ab1f | 10 |

The voting monitoring index of each consensus node is calculated again. In this embodiment, the voting monitoring indexes include a voting rate and a vote proportion. It should be understood that the voting monitoring indexes are configured to better play the role of node running state alarm, and in specific implementation, a voting rate or a vote proportion may be selected, or both of the voting rate and the vote proportion may be used as the monitoring indexes.

The voting rate is a ratio of the total number of times that each of the consensus nodes participates in voting to the total number of produced blocks in the blockchain within the time period, and thus the rate of successful voting of each node within the 15 minutes is as follows.

| Node identifier | Node address | The number of times of voting | Voting rate |
|---|---|---|---|
| A | 0x73ac08fcel073745c44c2b684847b1b68b642cb | 10 | 100% |
| B | 0x8c77a71c42086a2999183c0c86184bc49ae2c50c | 5 | 50% |
| C | 0xbc3aab4497a21c95b85686932eff9c978b7c3dcb | 10 | 100% |
| D | 0xf8b05fdb292200e8820f73be658c25d48989ab1f | 10 | 100% |

With regard to the voting proportion, Optionally, a voting proportion is a ratio of the total number of times that each of the consensus nodes participates in voting to the total number of times that all the consensus nodes in the blockchain participate in voting within the time period, and therefore the voting proportion calculation process of each node within the 15 minutes is as follows.

Node A, C, D:10÷(10+5+10+10)×100%=28.57%
Node B: 5÷(10+5+10+10)×100%=14.28%

| Node identifier | Node address | The number of times of voting | Voting rate | Voting proportion |
|---|---|---|---|---|
| A | 0x73ac08fce1073745c44c2b684847b1b68b642cb | 10 | 100% | 28.57% |
| B | 0x8c77a71c42086a2999183c0c86184bc49ae2c50c | 5 | 50% | 14.28% |
| C | 0xbc3aab4497a21c95b85686932eff9c978b7c3dcb | 10 | 100% | 28.57% |
| D | 0xf8b05fdb292200e8820f73be658c25d48989ab1f | 10 | 100% | 28.57% |

Finally, according to a preset alarm threshold value, it is determined which consensus nodes are faulty, and a corresponding state anomaly alarm is given. For the voting rate index, in response to the threshold being set as 100%, an alarm will be given automatically as long as there is a node whose voting rate is less than 100%. With regard to the voting ratio, according to a consensus mechanism, the voting distribution condition should be 25% when all the nodes are normal, i.e. when all the nodes successfully participate in the voting of each round of block production, the voting ratio is 10÷(10+10+10+10)×100%=25%, and an alarm is automatically given as long as the voting ratio of some nodes is lower than 25%. For the issuing of the alarm information, the node state monitoring component automatically sends a mail or a short message to notify the blockchain network administrator for inspection and maintenance.

Embodiment II

Figure 4:
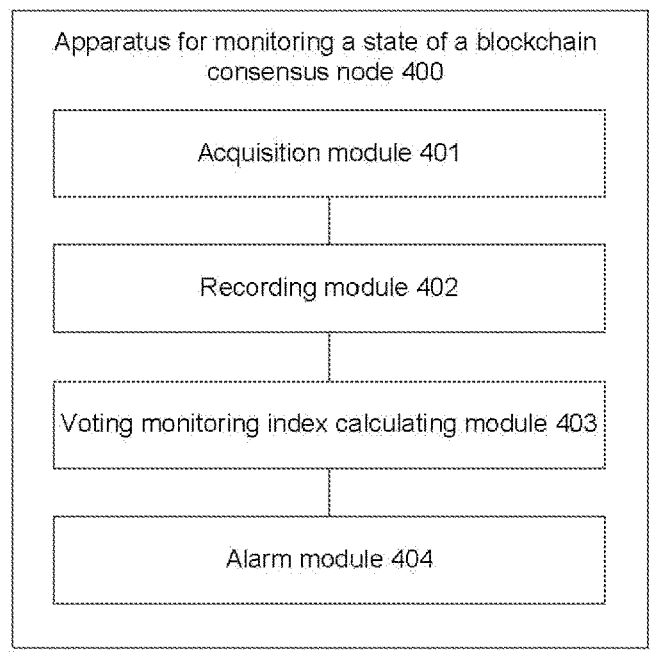
FIG. 4 is a structural schematic diagram of an apparatus for monitoring a state of a blockchain consensus node according to one embodiment of the present disclosure.

FIG. 4 is a structural schematic diagram of the apparatus 400 for monitoring a state of a blockchain consensus node according to one embodiment of the present disclosure. As shown in FIG. 4, in this embodiment, the apparatus 400 for monitoring a state of a blockchain consensus node includes the following modules.

An acquisition module 401 is configured to acquire an address list of all consensus nodes of a blockchain.

A recording module 402 is configured to recording the number of produced blocks and the number of times of voting by the consensus nodes in the produced blocks within a preset time period.

Optionally, before recording the number of times of successful voting of the consensus node, the number of times of voting of all the consensus nodes in the blockchain is cleared. The recording module is configured to acquire a consensus node address, participating in voting, in a block header of a current produced block; and in response to the consensus node address participating in the voting existing in the blockchain consensus node address list, add one to the number of times of voting of the corresponding consensus node in the blockchain.

A voting monitoring index calculating module 403 is configured to calculate a voting monitoring index of each consensus node, where the voting monitoring index includes at least one of a voting rate and a voting proportion.

Optionally, the vote monitoring index calculating module is configured to calculate the voting rate according to a ratio of the total number of times that each of the consensus nodes participates in voting to the total number of produced blocks in the blockchain within the time period.

Optionally, the voting monitoring index calculating module is configured to calculate the voting proportion according to a ratio of the total number of times that each of the consensus nodes participates in voting to the total number of times that all the consensus nodes in the blockchain participate in voting within the time period.

An alarm module 404 is configured to send, in response to the voting monitoring index of the consensus node being lower than a preset alarm threshold, a state anomaly alarm in respect of the corresponding consensus node. Optionally, the manners of issuing the state anomaly alarm include automatically sending at least one of an email, a short message, and a system message.

It should be understood that the apparatus for monitoring the state of the blockchain consensus node according to one embodiment of the present disclosure can also execute the method executed by the apparatus (or device) for monitoring the state of the blockchain consensus node in FIG. 1 to FIG. 2, and implement the functions of the apparatus (or device) for monitoring the state of the blockchain consensus node in the embodiments shown in FIG. 1 to FIG. 2, which will not be repeated herein.

Embodiment III

The system for monitoring a state of a blockchain consensus node provided in the embodiment includes a consensus node state monitoring component running on any node of a blockchain. It should be understood that, in the blockchain consensus node state monitoring system, there is one consensus node state monitoring component deployed on one node, there are multiple consensus nodes, and a consensus voting component is deployed on each consensus node and is configured to complete voting of each round of publicity.

The node state monitoring component is configured to acquire the consensus node address successfully participating in voting of each block by analyzing the header information of all the produced blocks within the preset time period, and then calculate the number of times of voting of each consensus node, so as to calculate the corresponding voting monitoring index. The conscious node state monitoring component is configured to acquire an address list of all consensus nodes of the blockchain, record the number of produced blocks and the number of times of successful voting by the consensus nodes in the produced blocks within a preset time period, calculate a voting monitoring index of each consensus node, and in response to the voting monitoring index of the consensus node being lower than a preset alarm threshold, issue a state anomaly alarm in respect of the corresponding consensus node.

Embodiment IV

Figure 5:
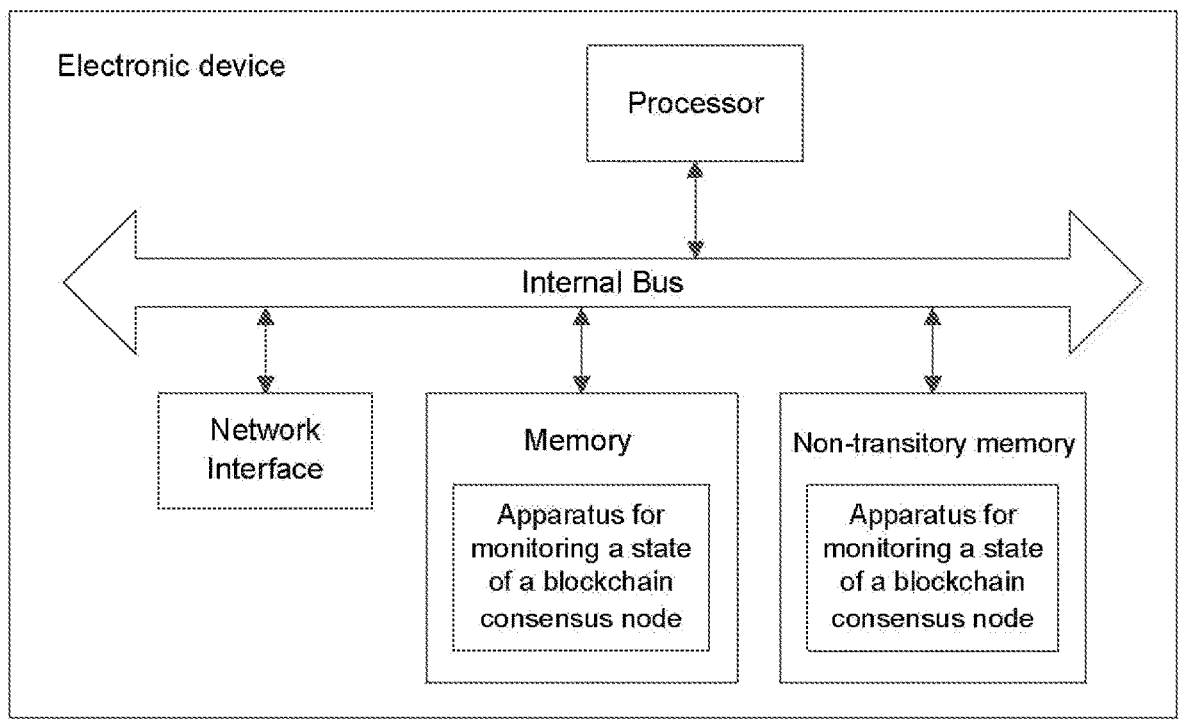
FIG. 5 is a structural schematic diagram of an electronic device according to one embodiment of the present disclosure.

FIG. 5 is a structural schematic diagram of an electronic device according to one embodiment of the present disclosure. As shown in FIG. 5, on a hardware level, the electronic device includes a processor, and optionally, further includes an internal bus, a network interface, and a memory. The memory may include a memory, for example, a random-access memory (RAM), and may also include a non-transitory memory, for example, at least one disk memory. Of course, the electronic device may also include hardware required by other services.

The processor, the network interface, and the memory may be connected to each other by means of an internal bus, and the internal bus may be an industry standard architecture (ISA) bus, a Peripheral Component Interconnect (PCI) bus, or an extended industry standard architecture (EISA) bus. The buses may be classified into address buses, data buses, control buses, etc. For ease of representation, one bidirectional arrow is shown in FIG. 5, but it is not indicated that there is only one bus or one type of bus.

The memory is configured to store at least one program. Specifically, the at least one program may include program codes, where the program codes include computer operation instructions. The memory may include a memory and a non-transitory memory, and provides instructions and data to the processor.

The processor is configured to read the corresponding computer program from the non-transitory memory into the memory and then runs, form a shared resource access control device on a logical level. The processor is configured to execute a program stored in a memory, and is specifically used for executing the following operations.

The program is applied to a consensus node state monitoring component running on any node of a blockchain, and the processor is configured to acquire an address list of all consensus nodes of a blockchain, record the number of produced blocks and the number of times of voting by the consensus nodes in the produced blocks within a preset time period, calculate a voting monitoring index of each consensus node, where the voting monitoring index includes at least one of a voting rate and a voting proportion, and in response to the voting monitoring index of the consensus node being lower than a preset alarm threshold, issue a state anomaly alarm in respect of the corresponding consensus node.

The method for monitoring a state of a blockchain consensus node disclosed in the embodiments shown in FIG. 1 to FIG. 2 of the present disclosure may be applied to or implemented by a processor. The processor may be an integrated circuit chip, and has a signal processing capability. In an implementation process, the steps of the methods may be completed by an integrated logic circuit of hardware in a processor or instructions in the form of software. The processor may be a general processor, including a central processing unit (CPU), a network processor (NP), and the like, or may be a digital signal processor (DSP), an application specific integrated circuit (ASIC), a field-programmable gate array (FPGA), or another programmable logic device, a discrete gate or transistor logic device, or a discrete hardware component. The methods, steps, and logical block diagrams disclosed in the embodiments of the present disclosure may be implemented or executed. The general-purpose processor may be a microprocessor, or the processor may also be any conventional processor, etc. Steps of the methods disclosed in the embodiments of the present disclosure may be directly embodied as being completed by a hardware decoder processor, or being completed by execution by a combination of hardware and software modules in the decoder processor. The software module may be located in a mature storage medium in the art, such as a random access memory, a flash memory, a read-only memory, a programmable read-only memory, or an electrically erasable programmable memory, and a register. The storage medium is located in the memory, and the processor reads information in the memory and completes the steps in the method in combination with hardware of the processor.

Of course, besides the software implementation manner, the electronic device of the embodiment of the present disclosure does not exclude other implementation manners, such as the manner of a logic device or a combination of software and hardware, that is, the execution subject of the following processing flow is not limited to various logic units, and may also be hardware or a logic device.

Embodiment V

One embodiment of the present disclosure further provides a computer readable storage medium storing at least one program, and the at least one program includes instructions which, when being executed by a portable electronic device includes multiple application programs, cause the portable electronic device to execute the method of the embodiments shown in FIG. 1 to FIG. 2.

The method is applied to a consensus node state monitoring component running on any node of a blockchain. The method includes the following steps:

acquiring an address list of all consensus nodes of a blockchain;

recording the number of produced blocks and the number of times of successful voting of consensus nodes in the produced blocks within a preset time period;

calculating a voting monitoring index of each consensus node, where the voting monitoring index includes at least one of a voting rate and a voting proportion; and in response to the voting monitoring index of the consensus node being lower than a preset alarm threshold, issuing a state anomaly alarm in respect of the corresponding consensus node.

In conclusion, the described content relates to exemplary embodiments of the present disclosure, and is not intended to limit the embodiment range of the present disclosure. Any modifications, equivalent replacements, improvements, etc. made within the spirit and principle of the present disclosure shall all fall within the scope of protection some embodiments of the present disclosure.

The system, apparatus, module, or unit described in the foregoing embodiments may be specifically implemented by a computer chip or an entity, or implemented by a product having a certain function. A typical implementation device is a computer. In particular, the computer may be, for example, a personal computer, a laptop computer, a cellular telephone, a camera phone, a smart phone, a personal digital assistant, a media player, a navigation device, an email device, a game console, a tablet computer, a wearable device, or a combination of any of these devices.

Computer-readable media include non-transitory or transitory, and removable or non-removable media, which may achieve storage of information by using any method or technology. The information may be computer readable instructions, data structures, modules of a program, or other data. Examples of the computer storage medium include but are not limited to, phase change memory (PRAM), static random-access memory (SRAM), dynamic random-access memory (DRAM), other types of random-access memories (RAM), read-only memory (ROM), electrically erasable programmable read-only memory (EEPROM), flash memory or other memory technology, compact disc read-only memory (CD-ROM), digital versatile disc (DVD) or other optical storage, magnetic cassettes, magnetic tape magnetic disk storage or other magnetic storage devices, or any other non-transmission media, which may be used to store information that may be accessed by the computing device. As defined herein, the computer-readable media do not include transitory computer-readable media, such as modulated data signals and carriers.

It should also be noted that the terms "include", "contain", or any other variations thereof are intended to cover a non-exclusive inclusion, so that a process, a method, a commodity, or a device that includes a series of elements not only includes those elements, but also includes other elements that are not explicitly listed, or further includes inherent elements of the process, the method, the commodity, or the device. Without further limitation, an element defined by a sentence "include a . . . " does not exclude other same elements existing in a process, a method, a commodity, or a device that includes the element.

The embodiments in the present disclosure are described in a progressive manner. For the same or similar parts among the embodiments, reference may be made to each other. Each embodiment focuses on differences from other embodiments. In particular, as the system embodiment is basically similar to the method embodiment, the description thereof is relatively simple, and for the related parts, reference may be made to the description of the method embodiment.

What is claimed is:

1. A method for monitoring a state of a blockchain consensus node, applied to a consensus node state monitoring component running on any node of a blockchain, comprising:
    acquiring an address list of all consensus nodes of the blockchain;
    recording a number of produced blocks and a number of times of successful voting of consensus nodes in the produced blocks within a preset time period;
    calculating a voting monitoring index of each consensus node, wherein the voting monitoring index comprises at least one of a voting rate and a voting proportion; and
    in response to the voting monitoring index of the consensus node being lower than a preset alarm threshold, issuing a state anomaly alarm in respect of the corresponding consensus node.

2. The method as claimed in claim 1, wherein before recording the number of times of successful voting of the consensus nodes, clearing a number of times of voting of all the consensus nodes in the blockchain comprises:
    acquiring a consensus node address participating in voting in a block header of a current produced block; and
    in response to the consensus node address participating in the voting existing in an address list of consensus nodes of the blockchain, adding one to a number of times of voting of the corresponding consensus node in the blockchain.

3. The method as claimed in claim 1, wherein the voting rate is a ratio of a total number of times that each of the consensus nodes participates in voting to a total number of produced blocks in the blockchain within the preset time period.

4. The method as claimed in claim 3, wherein the voting proportion is a ratio of the total number of times that each of the consensus nodes participates in voting to a total number of times that all the consensus nodes in the blockchain participate in voting within the preset time period.

5. The method as claimed in claim 1, wherein manners of issuing the state anomaly alarm comprise automatically sending at least one of an email, a short message, and a system message.

6. An electronic device, comprising:
    a processor; and
    a memory arranged to store computer executable instructions that, when executed, cause the processor to perform the method as claimed in 1.

7. A non-transitory computer readable storage medium, storing at least one program which, when being executed by an electronic device comprising a plurality of application programs, cause the electronic device to execute the method as claimed in claim 1.

8. An apparatus for monitoring a state of a blockchain consensus node, comprising:
    a hardware processor coupled with a memory and configured to execute program components stored on the memory;
    an acquisition module, configured to acquire an address list of all consensus nodes of a blockchain;
    a recording module, configured to recording a number of produced blocks and a number of times of voting by the consensus nodes in the produced blocks within a preset time period;
    a voting monitoring index calculation module, configured to calculate a voting monitoring index of each consensus node, the voting monitoring index comprising at least one of a voting rate and a vote proportion;
    an alarm module, configured to issue, in response to the voting monitoring index of the consensus node being lower than a preset alarm threshold, a state anomaly alarm in respect of the corresponding consensus node.

9. The apparatus as claimed in claim 8, wherein the recording module is configured to acquire a consensus node address, participating in voting, in a block header of a current produced block; and
    in response to the consensus node address participating in the voting existing in an address list of consensus nodes of the blockchain, add one to a number of times of voting of the corresponding consensus node in the blockchain.

10. The apparatus as claimed in claim 8, wherein the vote monitoring index calculating module is configured to calculate the voting rate according to a ratio of a total number of times that each of the consensus nodes participates in voting to a total number of produced blocks in the blockchain within the preset time period.

11. The apparatus as claimed in claim 10, wherein the voting monitoring index calculating module is configured to calculate the voting proportion according to a ratio of the total number of times that each of the consensus nodes participates in voting to a total number of times that all the consensus nodes in the blockchain participate in voting within the preset time period.

12. The apparatus as claimed in claim 8, wherein the manners of issuing the state anomaly alarm comprise automatically sending at least one of an email, a short message, and a system message.

13. A system for monitoring a state of a blockchain consensus node, comprising a consensus node state monitoring component running on any node of a blockchain, wherein the node state monitoring component is configured to acquire an address list of all consensus nodes of the blockchain, record a number of produced blocks and a number of times of successful voting by the consensus nodes in the produced blocks within a preset time period, calculate a voting monitoring index of each consensus node, and in response to the voting monitoring index of the consensus node being lower than a preset alarm threshold, issue a state anomaly alarm in respect of the corresponding consensus node.

\* \* \* \* \*